United States Patent
Collina

(10) Patent No.: US 11,747,182 B2
(45) Date of Patent: Sep. 5, 2023

(54) DEVICE TO MEASURE THE FLOW RATE OF A FLUID, SUCH AS CONCRETE, IN A PUMPING PLANT CONNECTED TO A DRILLING MACHINE

(71) Applicant: SOILMEC S.P.A., Cesena (IT)

(72) Inventor: Corrado Collina, Forli' (IT)

(73) Assignee: SOILMEC S.P.A., Cesena (IT)

( * ) Notice: Subject to any disclaimer, the term of this patent is extended or adjusted under 35 U.S.C. 154(b) by 152 days.

(21) Appl. No.: 16/770,515

(22) PCT Filed: Dec. 6, 2018

(86) PCT No.: PCT/IB2018/059696
§ 371 (c)(1),
(2) Date: Jun. 5, 2020

(87) PCT Pub. No.: WO2019/111190
PCT Pub. Date: Jun. 13, 2019

(65) Prior Publication Data
US 2021/0181003 A1    Jun. 17, 2021

(30) Foreign Application Priority Data
Dec. 7, 2017   (IT) .................... 102017000141585

(51) Int. Cl.
*G01F 1/66* (2022.01)
*E02D 5/34* (2006.01)
(Continued)

(52) U.S. Cl.
CPC ............ *G01F 1/666* (2013.01); *E02D 5/34* (2013.01); *E02D 5/56* (2013.01); *G01F 3/14* (2013.01);
(Continued)

(58) Field of Classification Search
None
See application file for complete search history.

(56) References Cited

U.S. PATENT DOCUMENTS

| 2015/0355003 | A1 | 12/2015 | Saeger et al. |
| 2016/0146649 | A1* | 5/2016 | Evans ............ G01F 3/00 73/861.08 |

FOREIGN PATENT DOCUMENTS

| CN | 1192793 A | * 9/1998 | ............ E02D 15/04 |
| CN | 105089062 A | * 11/2015 | |

(Continued)

OTHER PUBLICATIONS

International Search Report and Written Opinion from International Application No. PCT/IB2018/059696, dated Mar. 19, 2019.

*Primary Examiner* — Curtis A Kuntz
*Assistant Examiner* — Jerold B Murphy
(74) *Attorney, Agent, or Firm* — Merchant & Gould P.C.

(57) ABSTRACT

A device measures the flow rate of a fluid, such as concrete, in a pumping plant connected to a drilling machine provided with a drilling tool. The pumping plant includes a motor pump and a connection pipe to lead fluid from the motor pump to the drilling tool. The device includes a transmitting module, for rigidly and removably mounted on the pumping plant and including an accelerometer and a receiving module, associated with the drilling machine. The transmitting module detects accelerations generated by vibrations of the pumping plant during the pumping of the fluid. The accelerations indicate flow rate of the fluid. The transmitting module wirelessly sends a signal, which is processed based on the detected accelerations, to the receiving module. The receiving module receives the signal from the transmitting module and sends a signal indicating the flow rate of the pumped fluid based on the received signal.

13 Claims, 6 Drawing Sheets

(51) Int. Cl.
*E02D 5/56* (2006.01)
*G01F 3/14* (2006.01)
*G01F 25/10* (2022.01)

(52) U.S. Cl.
CPC .......... *G01F 25/10* (2022.01); *E02D 2600/10* (2013.01)

(56) References Cited

FOREIGN PATENT DOCUMENTS

| EP | 1356910 A1 | 10/2003 |
| EP | 1767741 A2 | 3/2007 |
| WO | 2018/093378 A1 | 5/2018 |

\* cited by examiner

DEVICE TO MEASURE THE FLOW RATE OF A FLUID, SUCH AS CONCRETE, IN A PUMPING PLANT CONNECTED TO A DRILLING MACHINE

This application is a National Stage Application of International Application No. PCT/IB2018/059696, filed 6 Dec. 2018, which claims benefit of Ser. No. 102017000141585, filed 7 Dec. 2017 in Italy and which applications are incorporated herein by reference. To the extent appropriate, a claim of priority is made to each of the above-disclosed applications.

TECHNICAL FIELD

The invention relates to a device that allows users to measure the concrete flow rate pumped by a pumping plant connected to a drilling machine.

TECHNOLOGICAL BACKGROUND

In the technical field of foundations, foundation piles are manufactured, which are made on site by means of suitable drilling machines, which make holes with a substantially circular shape and with a variable diameter and shape, depending on the specific needs, which are then filled with a hardening material, which is pumped into the holes by means of a pumping plant connected to the machine.

The drilling machines used to manufacture said piles created on site are provided with a mast, on which a rotary slides, which operates a drilling tool, usually a propeller. The rotary causes a rotation and a sliding of the drilling tool, which penetrates the ground and removes the material obtained by the drilling, thus creating a hole with a depth that is substantially equal to the length of the drilling tool. The drilling tool is provided with an inner duct, which extends through it along its entirety and permits the passage of a hardening fluid, which, during a foundation pile manufacturing step, is preferably introduced from the upper end of the tool and pumped so that it flows out of the lower end.

While the hole is being drilled in the ground, the hole itself can be filled with a stabilizing fluid (for example, a bentonite mud or a polymer mixture), which prevents the hole from collapsing due to the hydrostatic pressure generated on the walls of the hole. Once the desired drilling depth has been reached, a hardening fluid, usually concrete, is pumped into the drilling tool so that it flows out of the lower part of the tool and starts filling the hole starting from the bottom, while the tool is caused to progressively resurface. The hardening fluid is introduced into the tool by means of a pumping plant, which comprises a motor pump connected to the machine by means of a flexible pipe, which is preferably fixed to the upper end of the tool by means of a rotary joint, which allows the tool to freely rotate relative to the pipe. During the resurfacing of the tool, the hole part located under the tool must be kept full of hardening material, thus preventing the tool from moving away from the upper level of the pumped hardening fluid, since, in this space, the walls of the hole could crumble, causing the soil to fall into the hardening fluid, especially when the hole is drilled without stabilizing fluid. This would be a problem because the soil mixed with the hardening fluid could reduce the homogeneity of the hardening fluid and reduce the structural features of the pile when the hardening fluid solidifies. During the resurfacing of the tool and the pumping of the hardening fluid, the excess hardening fluid can be sucked from the upper part of the hole.

The motor pump of the pumping plant comprises, almost in every case, an axial piston pump and an operating pump, which delivers the power needed to move the pistons. The motor of the motor pump usually is a Diesel motor. The motor pump can be a self-moving motor pump, provided with tracks, so that it can follow the drilling machine during the movements inside the drilling site.

The quantity of hardening fluid, usually concrete or grout, to be pumped into the hole is set by the operator of the drilling machine and is usually controlled through a measuring system arranged on the motor pump or on board the drilling apparatus. Generally speaking, the instantaneous flow rate of the pumped fluid is measured in "pump strokes", which correspond to the number of compression strokes carried out by the pistons of the motor pump. Since the displacement of the pistons of the pump is fixed and determined, the number of pump strokes indicates the pumped flow rate. The operator of the drilling machine usually receives, as pile designing indications, the resurfacing speed to be kept and the number of pump strokes to be kept during the resurfacing of the tool with casting of hardening fluid, so that the hole is filled in a correct and homogeneous manner.

Generally speaking, in order to detect the pump strokes, the apparatuses of the prior art are provided with a pressure sensor mounted on board the drilling machine and in communication with the inner duct of the fluid pumping or conveying pipe, so as to detect pressure peaks corresponding to the fluid compression and pumping step, hence converting them into a number of pump strokes. In an alternative solution of the prior art, proximity sensors are mounted on board the piston pump which detect the movement of the pistons of the pump and, in particular, when they are in the point of their stroke corresponding to the compression end position, in order to then send a signal to the drilling apparatus, where the signal is properly processed so as to be converted into a number of pump strokes.

In other solutions, for example in motor pumps in which the hydraulic cylinders moving the pumping pistons are controlled through solenoid valves, the electrical signal controlling the switching of the solenoid valve is intercepted on board the distribution board of the motor pump. Indeed, every switching of the solenoid valve corresponds to an actuation of the pistons to carry out a pump stroke, hence the electrical switching signal can be directly associated with a pump stroke. In these cases, once the electrical signal controlling the pistons is intercepted, it is sent, through a wired or wireless technology, to the drilling apparatus, where the signal is processed, as already mentioned above.

For the introduction of the hardening fluid (e.g. concrete), a suitable volumetric pump with two pistons is usually used, the pistons receiving, in turn, the motion from two respective hydraulic cylinders, connected to a power and control plant. In one direction, the pistons generate a depression inside the cylinder where they slide, sucking the fluid into the cylinder itself, whereas, in the opposite direction, they create a pressure upon the fluid present in the cylinder and push it towards the delivery pipe. The motion of the two pistons, therefore, is a reciprocating motion and the speed thereof is adjusted by the operator, which sets it based on the desired value of the flow rate to be injected. The specific flow rate, namely the flow rate generated by each pump stroke corresponding to a stroke of the piston, is defined by and is a function of the diameter of the fluid delivery chamber and the stroke of the piston. By multiplying the specific flow rate by the number of strokes per minute of the pistons, expressed in strokes per minute, it is possible to determine the fluid flow rate sent to the hole. That is, unless there are real losses due to the compressibility of the air on the delivery chambers. Basically, once the geometric parameters of specific flow rate have been established, it is sufficient to measure the number of pump strokes per minute, namely the frequency of the pump strokes, in order to determine the flow rate of the pumped fluid.

The flow rate item of information is then displayed to the operator on board the drilling apparatus, who changes the operating speed of the pump based on the detected data, compared with the desired flow rate value. Therefore, the transmission of the item of information concerning the pump strokes of the pump itself to the drilling machine is very important.

In some drilling machines there further is a system for the automatic management of the introduction of the hardening fluid into the hole and the simultaneous resurfacing of the propeller drilling tool, this management is usually called automatic resurfacing. In order to carry out this automatic resurfacing, the control unit of the drilling machine receives, as an input, the item of information concerning the pump strokes per minute and, based on the latter, calculates the volume of fluid pumped into the hole. As a function of the volume introduced into the hole, the control unit automatically adjusts the resurfacing speed of the drilling tool.

The values of the strokes per minute of the pump and of the pumped hardening fluid flow rate as well as the item of information concerning the pumped fluid volume can be stored by the control system of the drilling machine, so as to allow the operators working in the drilling site to generate suitable reports concerning the work done and the successful manufacturing of the foundation piles.

The apparatuses involved in the construction of the foundation piles must often be subjected to maintenance operations and, therefore, a new motor pump might need to the connected to the drilling machine. This replacement requires, in a first step, the disconnection of all the sensors used for the detection of the flow rate of the motor pump to be subjected to maintenance and, then, in a second step, the connection of all the sensors of the new motor pump. This needs time and requires an effort of the operators working in the drilling site. Furthermore, the new motor pump to be connected could be a different model from the previous one and this would require an adjustment of the connections to the different mechanical structure. The assembly consisting of drilling machine—pipes—motor pump must be capable of being easily moved from the position corresponding to a pile that was just manufactured to the position of the next pile to be manufactured.

Therefore, the object of the invention is to provide a system that enables the calculation of the flow rate of the pumped fluid, usually concrete, characterized by an extreme easiness of installation and removal and capable of being installed without invasive interventions on board the motor pump. In particular, no mechanical parts of the machine need to be removed to allow sensors to be installed and no changes have to be made to the electrical or hydraulic system of the motor pump. Hence, the installation of the flow rate measuring system becomes independent of the brand and model of the motor pump, as well as of the possible data transmission system between the motor pump and the machine, which can be already present on them.

It is known, for example from patent DE4206576, that the flow rate and pump stroke measuring systems used in the prior art are usually mounted on board the conveying motor pump. Therefore, the connection and the transmission of information between the pump and the drilling machine are always problematic. Indeed, it is on board of the drilling machine that the reading in real time of the item of information concerning the pump strokes or the flow rate can be useful in order to adjust the operating speed of the motor pump itself as a function of the treatment carried out with the drilling machine or, vice versa, to adjust the movement of the drilling tool based on the item of information concerning the pump strokes or the flow rate received from the pump. The connection difficulties usually lie in the transmission of information between systems built by different manufacturers and with different plant logics as well as in the interpretation of said information by the electronic management system of the drilling machine.

In other known solutions, systems for the measurement of the flow rate of the conveying pump are used, which are placed on board the drilling machine and detect the value of the pump strokes based on the pressure of the fluid flowing through the pipes on board the drilling machine, before getting to the drilling tool.

However, there are problems concerning the calibration of these flow rate measuring systems, with particular reference to the detection of the pump stroke, in case the pressure of the fluid is very low. Furthermore, the pressure sensors, in these solutions, must face or be in communication with the inner duct of the pipe and, therefore, are in direct contact with the pumped fluid. Since the fluid contains cement-like mixtures, it is strongly abrasive and this causes a quick wear of the sensor, which must frequently be overhauled or replaced.

Going back to the measuring systems located on board the pump, they usually use proximity sensors, pressure transducers or flow rate transducers. The systems using proximity sensors carry out, through them, a reading of the end positions of the stroke of the pistons, so as to determine the number of strokes per minute of the pump. The systems based on pressure transducers, on the other hand, measure cyclic pressure peaks inside a portion of the delivery duct, which are typical for a stroke, and count these pressure peaks in order to determine the strokes per minute. Finally, the systems based on ultrasound flow rate sensors read the transmission speed of sound waves inside the pipe where the fluid flows. The fluid flowing speed changes the transmission speed of the sound waves and how they reflect, which means that, based on the actual transmission speed of the waves, these systems obtain the fluid flow rate flowing in the pipe. These systems work correctly when they are used in rigid pipes, for example metal pipes, but have the defect of not being compatible with flexible pipes, usually made of reinforced plastic or rubber materials. In case of flexible pipes, like the ones typically used to pump the hardening fluid between the motor pump and the drilling machine, the material of the pipe distorts the reflection of the sound waves and, therefore, prevents these measuring systems from working correctly.

In case of the solution with a proximity sensor reading the strokes of the piston on board the pump, there are problems concerning the installation of the sensor and of the relative abutment, which is not always easy to be carried out, as it often requires an electromechanical adjustment of the machine, with a mechanical intervention for the application of the sensors in the right positions, so as to carry out a correct reading, and an intervention inside the distribution board of the piston pump, so as to connect the sensors to the power supply and control plant. These changes are, in some cases, fairly complicated and costly in terms of time needed. In case the signal is intercepted on board the distribution board of the pump, reading through the voltage or the excitation current of the solenoid valves controlling the pistons, the number of strokes of the pistons and, hence, the pump strokes, a complicated electrical change should anyway be carried out, like in the previous case.

If a reading on board the pump, in general, is chosen, a problem arises concerning the fact that, when the drilling works end or in case of a fault of the pump, the application on board the pump and the radio modules must be removed in order to be then fitted on the new pump.

These operations require a significant resource effort by the operators working in the drilling site. Indeed, there frequently is the need to partly replace the pump-drilling machine assembly, due to scheduled or exceptional maintenances, which can force a machine to be replaced with another one, thus generating the problems discussed above. This leads to the solution of a new system capable of solving the problems mentioned above in a simple manner and easy to be installed.

Finally, the use of flow rate ultrasound sensors, besides being expensive, often leads to precision problems when measuring the flow rate, due to the physical features and to the turbidity of the hardening fluid. Furthermore, the hardening fluid can cause a quick wear of the sensor, in case it is used in direct contact with the fluid.

SUMMARY OF THE INVENTION

An object of the invention is to provide a measuring device which is capable of solving this and other drawbacks of the prior art and which, at the same time, can be produced in a simple and economic fashion.

The invention is aimed at solving the aforesaid problems by means of a device which can be easily fixed on the motor pump or on the pipe line connecting the motor pump to the drilling machine and allows the fluid flow rate to be measured through a reading of the vibrations of the pump or of the pipe itself. The output and input signals between modules of the measuring device are transmitted by means of a wireless technology. The device comprises fixing elements, which allow one module or both modules of the measuring device to be quickly mounted, so as to accelerate the maintenance times of the pumping plant and/or of the drilling machine.

The appended claims are an integral part of the technical teaches provided in the following detailed description concerning the invention. In particular, the appended dependent claims define some preferred embodiments of the invention and describe optional technical features.

BRIEF DESCRIPTION OF THE DRAWINGS

Further features and advantages of the invention will be best understood upon perusal of the following detailed description, which is provided by way of example and is not limiting, with reference to the accompanying drawings, wherein.

DETAILED DESCRIPTION OF THE INVENTION

Figure 1:
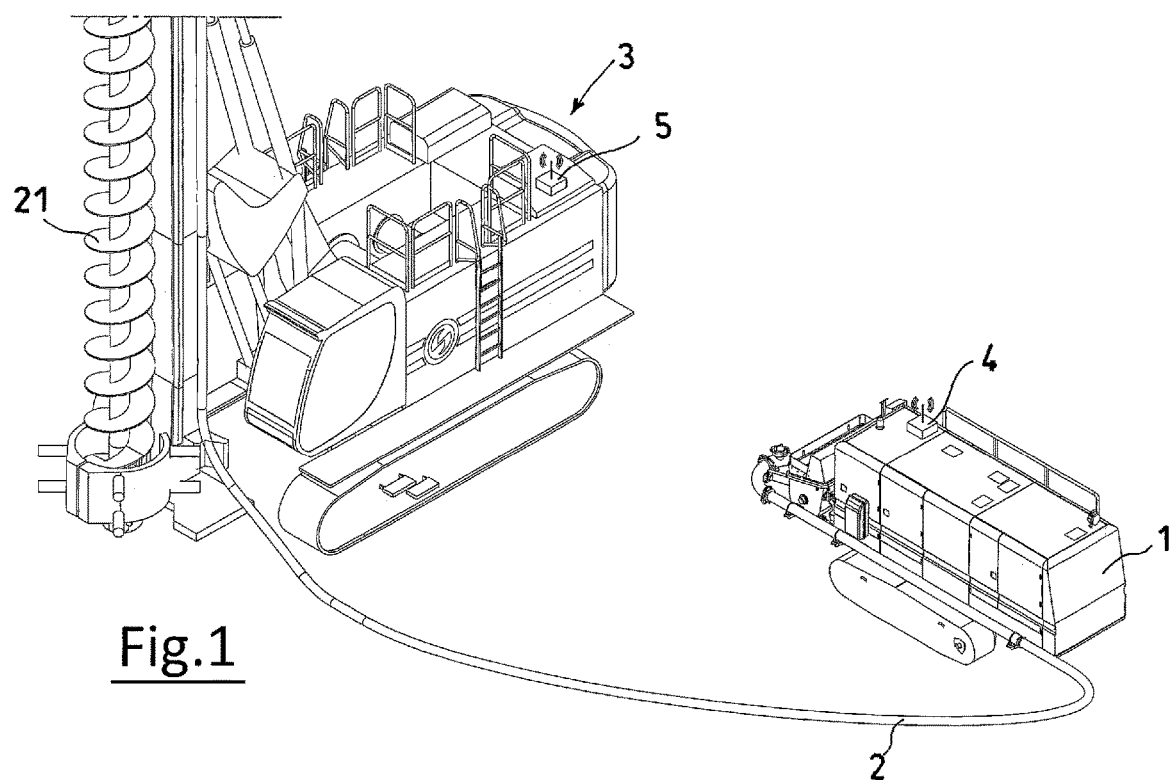
FIG. 1 is a perspective view of the flow rate measuring device installed on a system consisting of the drilling machine and of the pumping plant comprising a motor pump and a connection pipe.

With reference to FIG. 1, a motor pump 1, preferably a piston motor pump, sends a fluid, in particular a hardening fluid, such as concrete, to drilling machine 3 by means of a connection pipe 2. Connection pipe 2 can consist of a plurality of pipe segments connectible to one another through proper sealing connections, so as to adjust the length of the pipe to the dimensions of drilling machine 3 and to the distances between drilling machine 3 and motor pump 1 established by the conformation of the drilling site.

The aforesaid figure shows a device to measure the flow rate of a fluid, such as concrete, in a pumping plant connected to a drilling machine 3 provided with a drilling tool 21, said pumping plant comprising a motor pump 1 and a connection pipe 2 to lead the fluid from said motor pump 1 to drilling tool 21, which, in the example shown therein, is a propeller. Said device comprises:

- at least one transmitting module 4, adapted to be rigidly mounted, in a removable manner, on the pumping plant and comprising at least one accelerometer 9,
- a receiving module 5, adapted to be associated with drilling machine 3.

Transmitting module 4 is configured to detect the accelerations generated by the vibrations of the pumping plant during the pumping of the fluid, said accelerations indicating the flow rate of the fluid, and to send a signal, which is processed based on the detected accelerations, to receiving module 5 through wireless transmission.

Receiving module 5 is configured to receive the signal from transmitting module 4 and to send a signal indicating the flow rate of the pumped fluid based on the received signal. Preferably, receiving module 5 is adapted to be mounted on drilling machine 3 in a removable manner.

For example, as it is known, drilling machine 3 is used to manufacture foundation piles created on site in the ground and, in particular, is adapted to drill holes with a substantially circular geometry, which are then filled with the fluid pumped into the hole by means of the pumping plant. It 3 can conveniently be a mast on which a rotary slides, which operates drilling tool 21, usually a propeller or an Archimedes' screw. The rotary causes a rotation and a sliding of drilling tool 21, which penetrates the ground and removes the material subjected to the drilling, thus creating a hole with a depth that is substantially equal to the length of drilling tool 21. Drilling tool 21 is provided with an inner duct, which extends through it along its entirety and permits the passage of the fluid, which, during a foundation pile manufacturing step, is introduced from an upper end of drilling tool 21 and pumped so that it flows out of the lower end. Once the desired drilling depth has been reached, the fluid is pumped into drilling tool 21 so that it flows out of the lower part of drilling tool 21 and starts filling the hole starting from the bottom, while drilling tool 21 is caused to progressively resurface. The fluid is introduced into drilling tool 21 by means of a pumping plant. The fluid is a hardening fluid, in particular concrete.

In particular, the signal generated by transmitting module 4, 4a indicates the "pump strokes" of motor pump 1. The output signal of transmitting module 4 can comprise, for example, at least one between: the flow rate of the fluid, the "pump strokes" per time unit. Hence, transmitting module 4 is adapted to process the flow rate value as a function of the detected pump strokes and of designing features of motor pump 1 (e.g. displacement, number of pistons); alternatively, it 4 is adapted to determine the pump strokes and to transmit this item of information to receiving module 5, which can the determine the flow rate based on this item of information. Therefore, according to an embodiment, the signal generated by transmitting module 4, 4a indicates the pump strokes of motor pump 1.

The signal indicating the fluid flow rate emitted by receiving device 5 can comprise, for example, at least one between: the flow rate of the fluid, the "pump strokes" per time unit. Furthermore, receiving module 5 can emit, for example, an item of information concerning the total quantity of pumped fluid relative to a measurement beginning time as well as the total number of detected "pump strokes".

Transmitting module 4 is adapted to be rigidly constrained to the pumping plant, i.e. to motor pump 1 or to connection pipe 2. Transmitting module 4 conveniently comprises fixing means, for example a magnetic fixing element, to mount transmitting module 4 on motor pump 1 of the pumping plant in a rigid and removable manner. Transmitting module 4 is mounted on motor pump 1 by means of a magnetic support (not shown in the figure). In other constructive variants, the rigid and removable fixing can be obtained by means of: threaded screws or bases, bayonet coupling, hook or clamp locking, any other type of rigid, non-permanent fixing, which can easily be removed. For example, on motor pump 1 there could be a welded base, on which there is a screw or a worm screw, whereas on transmitting module 4 there is a corresponding threaded element, so that transmitting module 4 can be screwed to the base. transmitting module 4 detects the vibrations of motor pump 1, generated during the operation, and processes them so as to count the "pump strokes". Subsequently, transmitting module 4 transmits the item of information, through wireless connection, to receiving module 5 mounted on drilling machine 3. Said receiving module 5 is connected to a control system, in particular to a programmable controller 32 (CPU) of drilling machine 3. Receiving module 5 delivers to the programmable controller, preferably in the form of a binary voltage signal, the items of information received from transmitting module 4. Programmable controller 32 is part of the control system of the drilling machine, which is preferably adapted to control at least the movements of drilling tool 21, in particular translation and rotation of the propeller. Therefore, receiving module 5 is configured to send the signal indicating the flow rate to a control system of drilling machine 3.

According to a possible variant, the receiving module 5 is configured to send the signal indicating the flow rate to a displaying device, which can conveniently be comprised in drilling machine 3, so as to display at least one among the following items of information: frequency of the pump strokes of motor pump 1, total number of pump strokes, flow rate of the fluid, total volume of pumped fluid.

According to FIG. 2, transmitting module 4 has an outer casing, which can be made, for example, of a plastic or metallic material, preferably resistant to atmospheric conditions, and comprises a base box 6 and a lid 7. Base box 6 comprises magnetic connection means, so that it can be extremely quickly mounted, in a removable manner, on motor pump 1, for example on the outer covers of the pump body, which are usually made of a metal material. Alternatively, base box 6 of transmitting module 4 can be connected to any fixed part of pump 1, namely to any part that is rigidly constrained to the pump body, so as to avoid an excess damping of the vibrations, thus allowing them to be correctly detected by accelerometer 9.

Figure 2B:
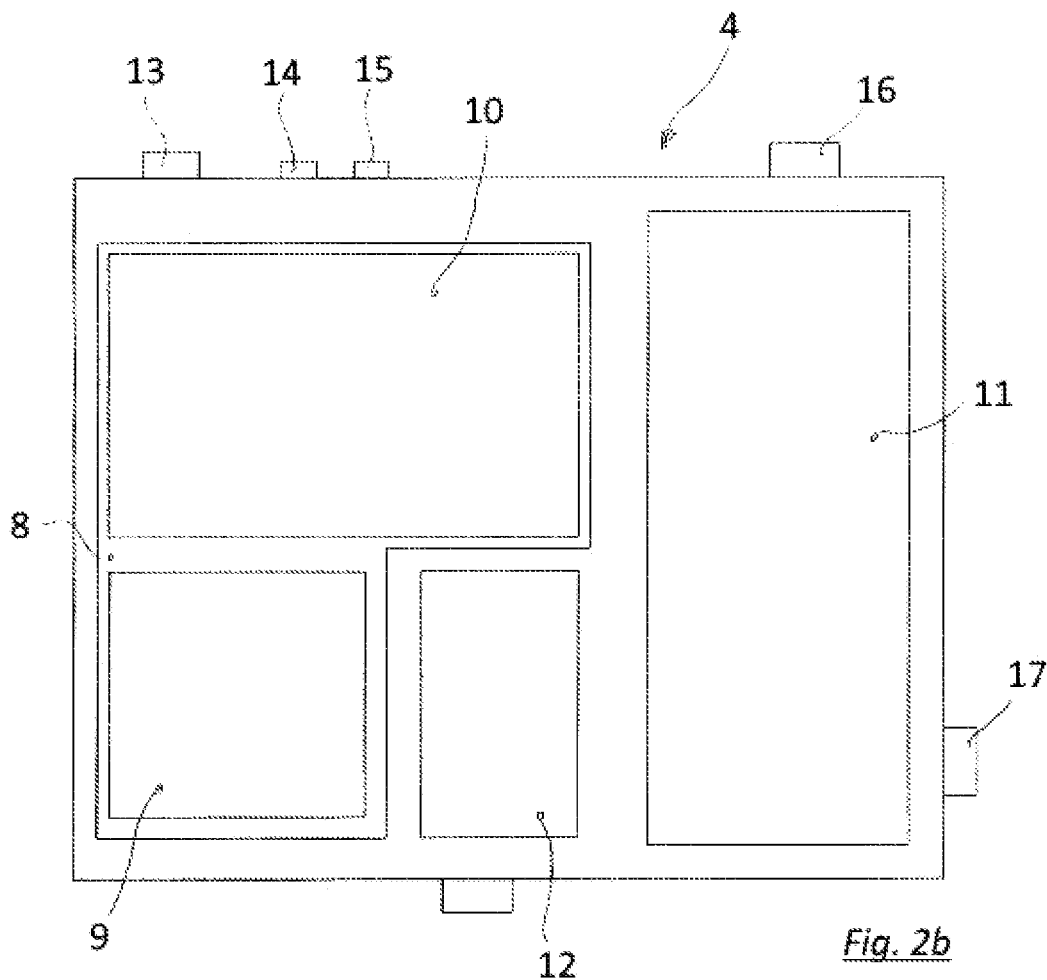
FIGS. 2a and 2b are, respectively, a perspective view according to a first embodiment of the transmitting module and a plan view of the module without the lid.

According to the preferred variant of FIG. 2b, inside transmitting module 4 there is housed an electronic board 8, on which there is mounted at least one accelerometer 9 or acceleration transducer, which is capable of measuring accelerations oriented in the direction of at least one axis. According to a possible variant, said accelerometer 9 is capable of measuring the accelerations along the three directions of the axes of a Cartesian triad. In particular, electronic board 8 is connected not only to accelerometer 9, but also to a microcontroller 10 (MC) to process the acceleration signal measured by accelerometer 9 and, conveniently, to a battery 11, for example a rechargeable one, to supply power to electronic board 2 and to the components connected thereto. Transmitting module 4 further comprises a radio transmitter 12, in particular electrically connected to electronic board 8, to transmit data through wireless technology.

In particular, transmitting module 4 shown herein further comprises at least one LED 13 connected to electronic board 8; in particular, it 13 is mounted on a wall of base box 6, so as to be visible from the outside of the outer casing. Said LED 13 can have different functions, among them there are the functions of communicating to the operator the operating state of transmitting module 4 (for example in order to indicate faults or the state of charge of the electrical battery, etc.), giving information concerning the automatic adjustment, the setting of the parameters "time filter" and "stroke offset", which will be defined below, and information concerning the state of charge of battery 11.

Transmitting module 4, 4a is preferably configured to receive operating settings from a user. In a variant, transmitting module 4a conveniently includes at least one display 18, such an LCD display, to show operating information.

Transmitting module 4, 4a is preferably configured so that, if the intensity of the accelerations generated by the vibrations detected by accelerometer 9 remains within detection threshold values, said accelerations are not taken into account to emit the signal generated by transmitting module 4, 4a. In this way, the accelerations due to vibrations that are present when motor pump 1 is in an "empty" or "load-less" operating condition, namely when motor pump 1 has the motor turned on, but does not pump the fluid towards drilling machine 3, are not taken into account. Therefore, the measurement is more reliable. In particular, transmitting module 4, 4a comprises at least one control element, such as a trimmer 15 or a button 20, to set the values of the acceleration amplitudes corresponding to the detection thresholds.

Figure 7:
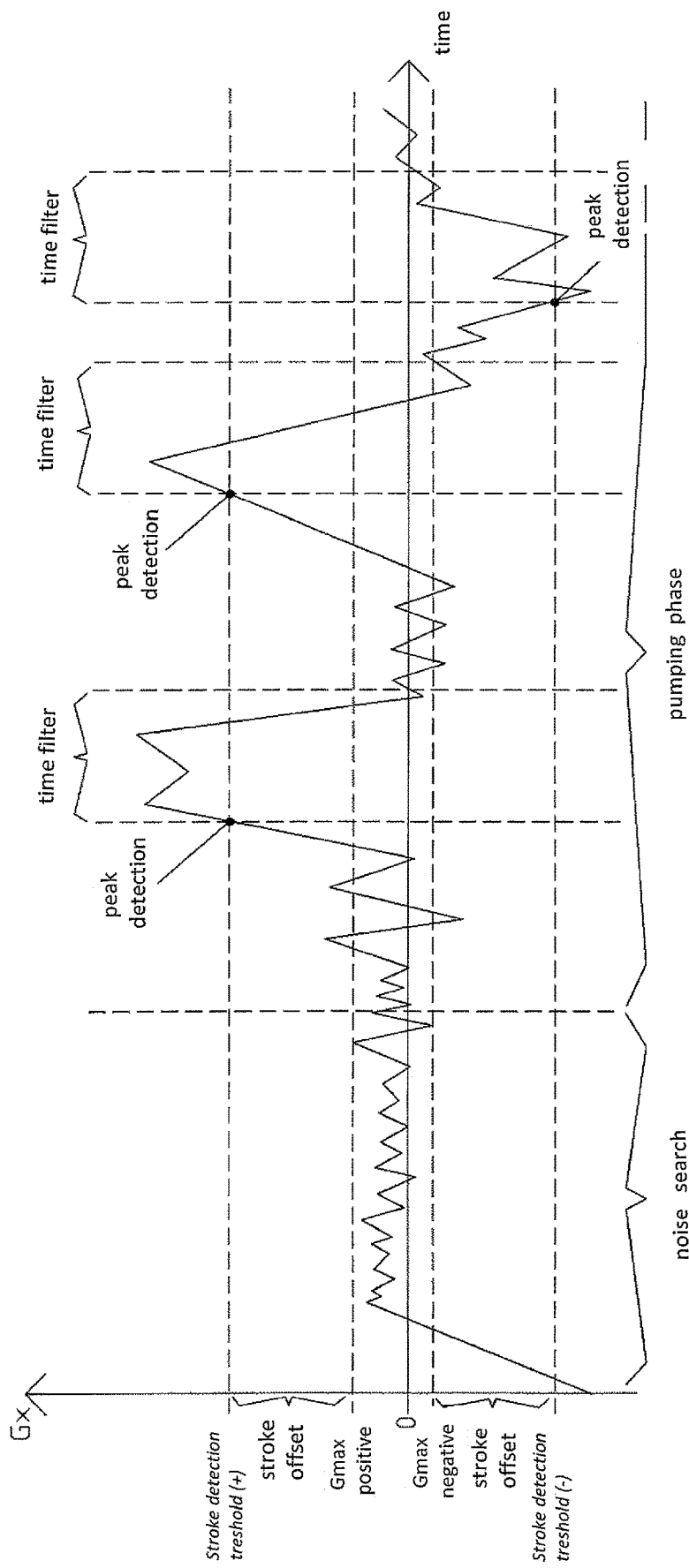
FIG. 7 is a simplified graphic representation of the vibrations, according to a direction, measured by the device as a function of the time.

In particular, transmitting module 4, 4a is configured to generate a signal corresponding to the exceeding of the detection threshold value. Transmitting module 4, 4a is preferably configured so that, when the intensity of the detected accelerations exceeds one of the detection threshold values, the accelerations following the exceeding are not taken into account to emit the output signal generated by transmitting module 4, 4a, if said accelerations take place in a time interval defined by a "time filter" (FIG. 7). In this way, only the first peak exceeding the detection threshold causes the emission of the signal by the transmitting module, but possible acceleration peaks quickly following one another after the first peak, even though exceeding the detection threshold, are not taken into account for the entire interval of action of the time filter. By so doing, the measurement becomes even more reliable. In particular, transmitting module 4, 4a comprises at least one control element, such as a trimmer 14 or a button 20, to set the duration of the time filter.

Transmitting module 4, 4a is preferably configured to carry out adjustment operations of the flow rate measuring device. Transmitting module 4, 4a is configured to analyze the intensity of the vibrations for a predetermined adjustment time ("noise search" time in FIG. 7), in which motor pump 1 does not pump the fluid, but is in an "empty" operating condition, and to determine an adjustment interval, which is defined by the positive maximum values (Gmax positive) and by the negative maximum values (Gmax negative) of the acceleration detected in the adjustment time. The positive detection threshold and the negative detection threshold of the pump strokes are subsequently set also as a function of the values measured during the adjustment interval.

Figure 2A:
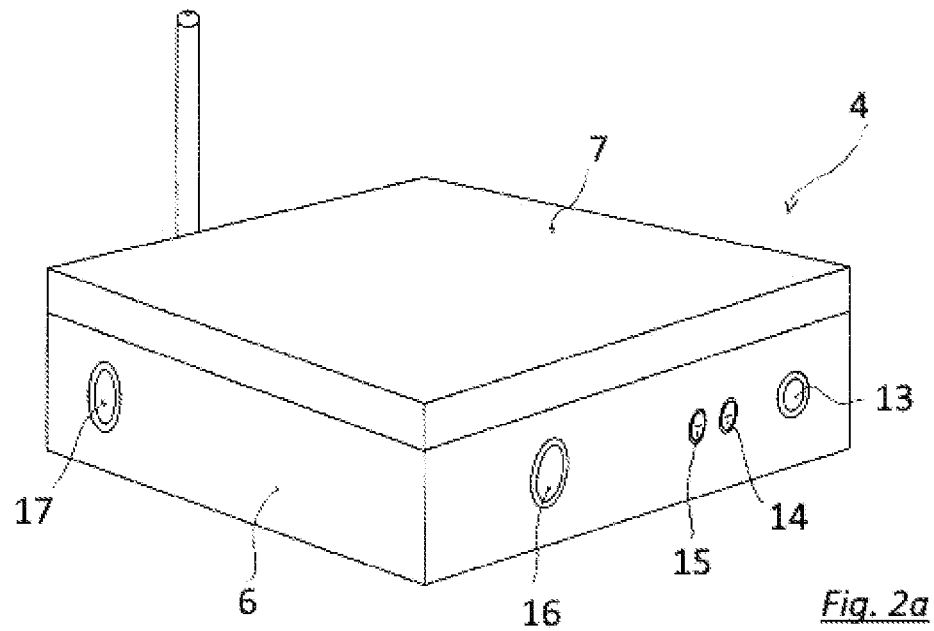

With reference to the particular variant shown in FIGS. 2a and 2b, there is at least one electronic trimmer 14, connected to electronic board 8 and accessible from the outside of the casing, to carry out the operations aimed at setting the filters and the amplitude of detection of the vibrations by transmitting module 4. In the variant of FIGS. 2a and 2b, there are two trimmers 14 and 15: trimmer 14 is used to set the duration of the "time filter", whereas trimmer 15 is used to set the parameter "detection threshold", in particular to set the parameter "stroke offset" as described below.

The measuring device according to the invention is conveniently configured to carry out self-adjustment operations. Transmitting module 4 preferably comprises a button 16 to carry out the self-adjustment of the measuring device. In a convenient embodiment, there is a button 17 to turn on and off transmitting module 4. Alternatively, transmitting module 4 can be automatically turned off after a predetermined amount of time in which it is not used.

Figure 3:
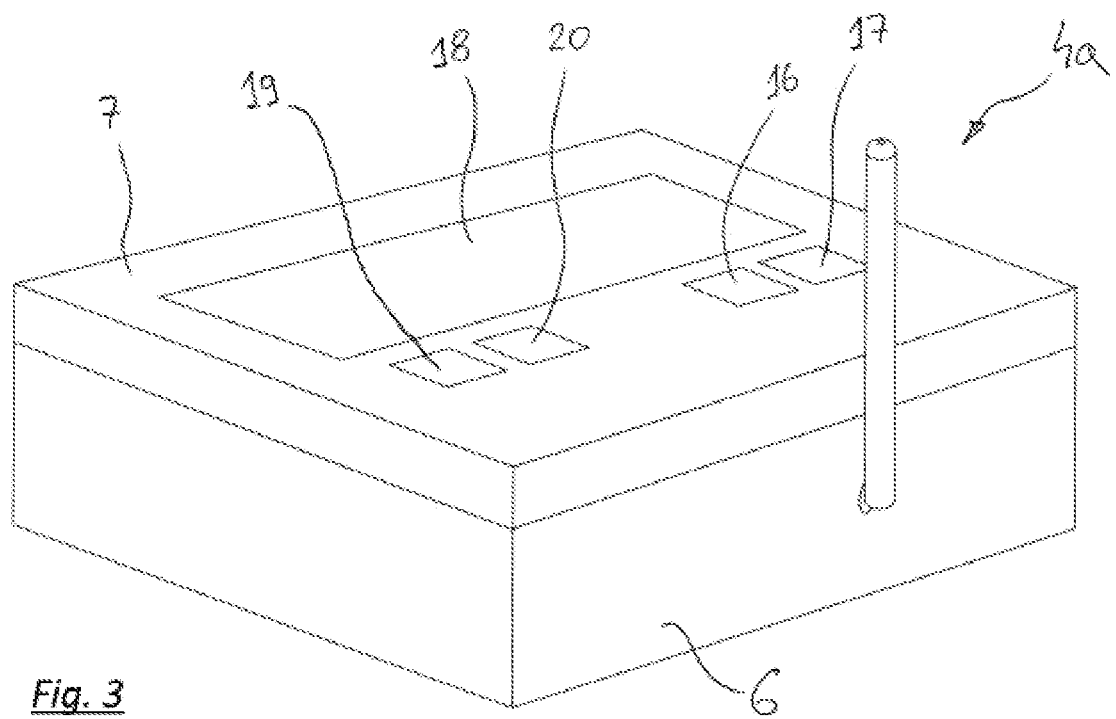
FIG. 3 is a perspective view of a second embodiment of the transmitting module.

FIG. 3 shows an alternative variant of transmitting module 4a, in which the LEDs and the trimmers were eliminated and replaced with a display 18, for example a liquid-crystal display, and two buttons 19, 20, respectively. Display 18 allows users to provide the information needed for the adjustment of the flow rate measuring device. The self-adjustment is carried out, in this variant, by means of at least button 16. In the example, button 19 allows users to set the parameter "time filter" and button 20 allows users to set the parameter "detection threshold" (or detection threshold value), in particular "stroke offset". Transmitting module 4a can comprise button 17 for turning on and off the transmitting module, or it can be programmed with a self-off function after a predetermined time of inactivity of the module.

Figure 4:
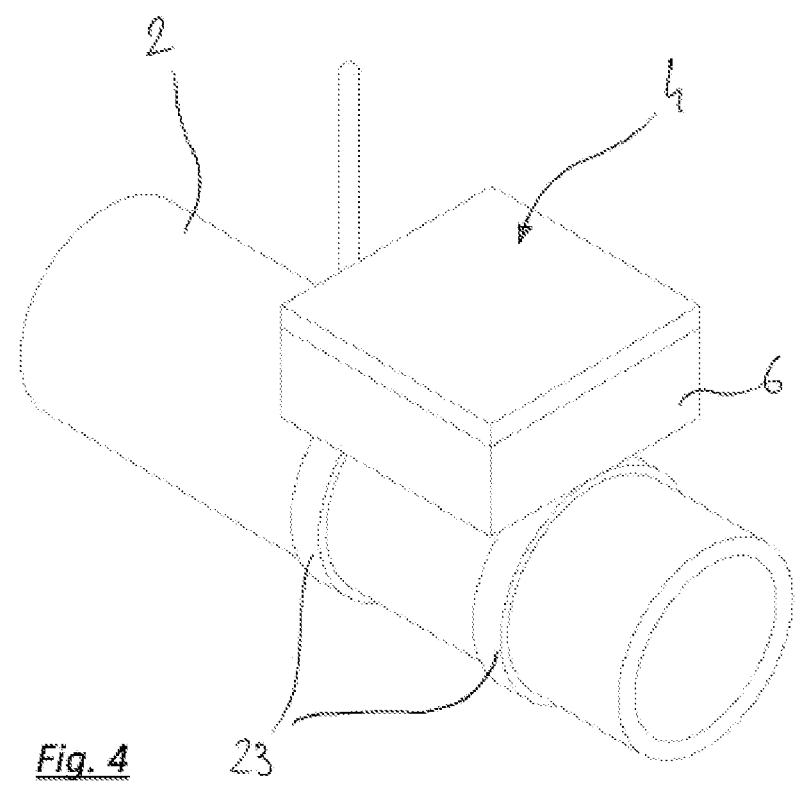
FIG. 4 is a perspective view of a preferred variant of the transmitting module connected to a connection pipe through ties.

FIG. 4 shows a further installation mode of transmitting module 4, in which transmitting module 4 comprises holding means to mount transmitting module 4 on connection pipe 2 of the pumping plant. In the example shown therein, base box 6 is provided with holding means, which allow the transmitting module 4 to be connected to connection pipe 2. For example, the holding means can be ties 23, conveniently adjustable ties, or clamps adapted to be coupled to the outer surface of connection pipe 2. This installation mode allows transmitting module 4 to be housed in any point of connection pipe 2 between motor pump 1 and drilling machine 3, so as to measure the accelerations caused by the vibrations on connection pipe 2 and, consequently, detect the pump strokes and, hence, the fluid flow rate.

Figure 5A:
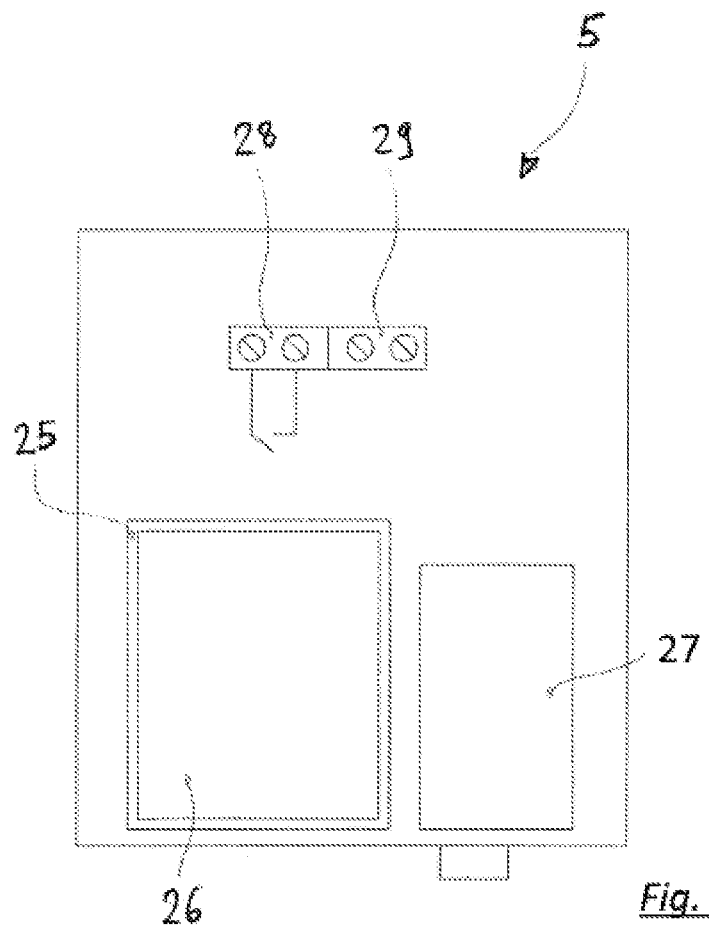
FIGS. 5a and 5b are, respectively, a plan view of a particular variant of the receiving module without lid and a perspective view of the module with the lid.
Figure 5B:
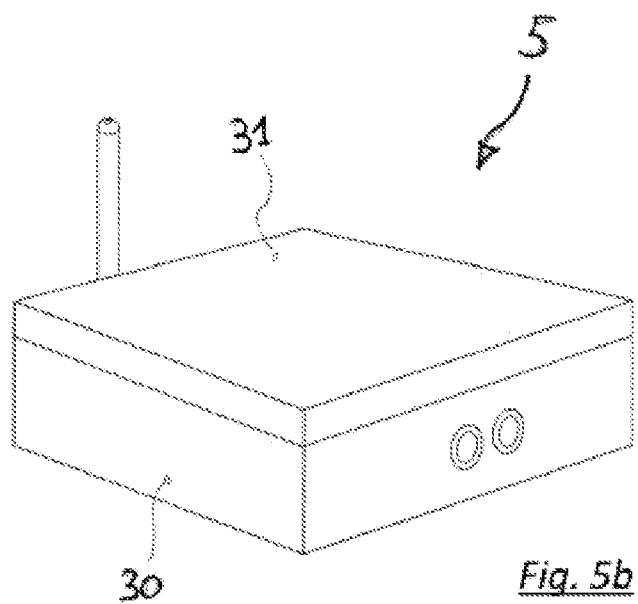

According to the particular variant of FIG. 5b, receiving module 5 has an outer casing, which can be made, for example, of a plastic or metallic material, conveniently resistant to atmospheric conditions, and comprises a base box 30 and a lid 31. FIG. 5a shows a plant view of receiving module 5 without lid 31. In particular, base box 30 houses an electronic board 25, which is connected to at least one microcontroller 26 MCU and a radio receiver 27. Microcontroller 26 can be connected to the control system of drilling machine 3 by means of an electrical connector 28. Receiving module 5 can be provided with an electrical connector 29 to be connected, for example, to the electrical system of drilling machine 3, so as to receive the electrical power needed to supply power to receiving module 5. Alternatively, receiving module 5 can include a battery, conveniently a rechargeable battery, to supply power. Receiving module 5 can be fixed to drilling machine 3 in a permanent manner or, alternatively, it can be connected to a magnetic base (not shown) or to another removable, rigid connection system, which allows it to be easily removed.

Figure 6:
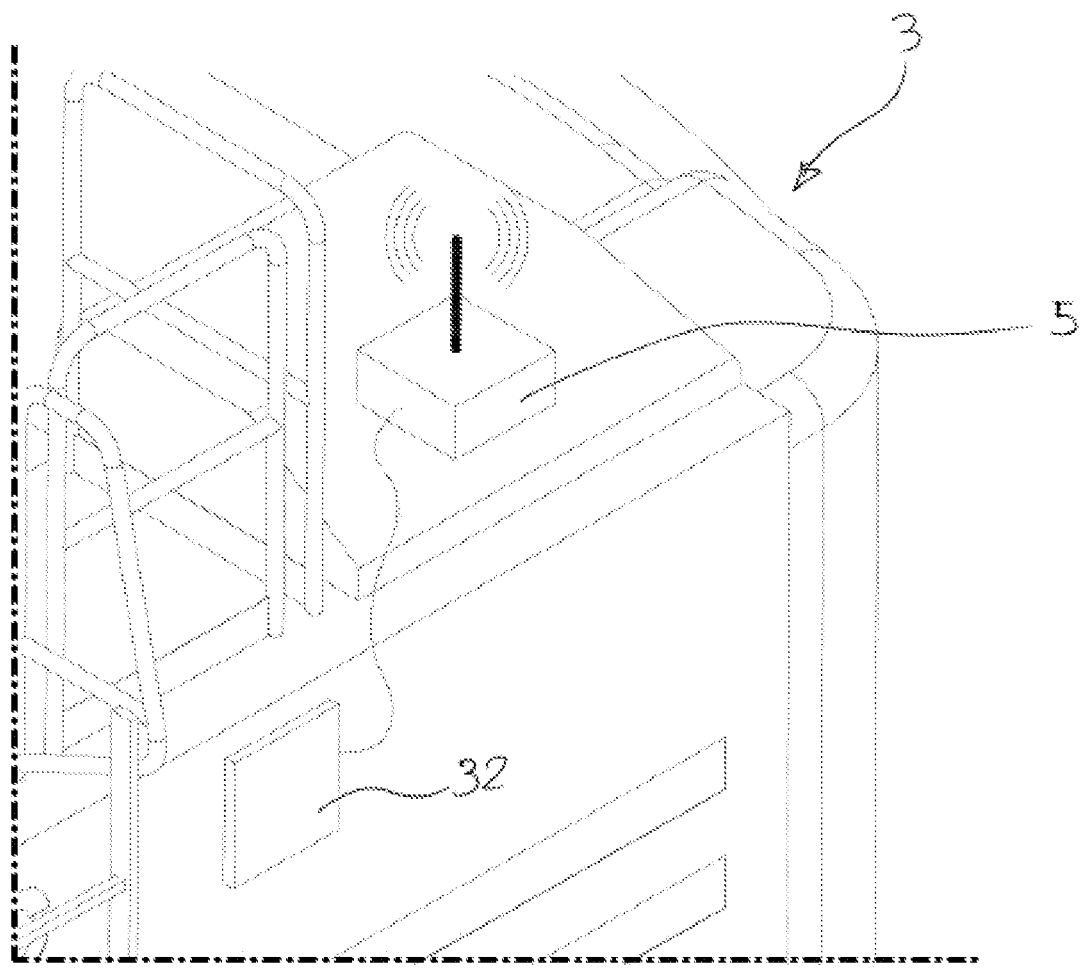
FIG. 6 is a perspective view of the receiving module installed on the drilling machine.

FIG. 6 shows a possible installation mode of receiving module 5, which is mounted on drilling machine 3. In the figure, receiving module 5 is mounted on an outer part of drilling machine 3, but it can also be mounted on an inner part. Optionally, receiving module 5 can be integrated in or mounted on an electronic control unit of drilling machine 3. Receiving module 5 is connected to programmable controller (CPU), which is part of the control system of drilling machine 3. The connection shown between receiving module 5 and programmable controller 32 is a wired connection, but a wireless connection is also possible. Through this connection, receiving module 5 transmits the item of information concerning the calculation of the pump strokes to the control system of drilling machine 3. In a possible variant of the invention, receiving module 5 can further receive information from the control system of drilling machine 3, so as to then send it to one or more transmitting modules 4, which are located on motor pump 1 and/or on connection pipe 2. In this variant, modules 4 and 5 are capable of communicating with one another so as to send and receive signals.

FIG. 7 shows, by way of example, a schematic representation of a measurement of the accelerations generated by the vibrations of the pumping plant as a function of the time, acquired by transmitting module 4. A diagram is shown, with the time on the horizontal axis and the amplitude of the accelerations on the vertical axis. In the case of FIG. 7, the accelerations were measured in one single direction (e.g. direction x) by means of a single-axis accelerometer; however, all the concepts explained hereinafter also apply to measurements of the vibrations oriented along remaining axes y and z and measured with three-axis accelerometers or with a multitude of properly oriented single-axis accelerometers.

The description below relates to a preferred, non-limiting embodiment of the device according to the invention. The signal obtained from the measurement carried out, whose development is shown in FIG. 7, is analyzed by means of a procedure for the calculation of the pump strokes, which is performed by microcontroller 10 of transmitting module 4. This procedure allows for the calculation of the frequency, for example in number of strokes per minute, and of the total pump strokes occurred in the measuring interval. Since, in motor pumps, the displacement and, hence, the volume pumped with each stroke of the piston are known, by measuring the frequency and the total number of pump strokes it is possible to calculate the instantaneous flow rate and the volume pumped in a time interval.

The pump stroke calculation procedure comprises an initial step for the calibration or self-adjustment of the flow rate measuring device so that it can adjust to the features of motor pump 1 or of the pumping plant on which it is installed. This procedure is carried out in an "empty" or "load-less" operating condition of motor pump 1, in which the motor of motor pump 1 is turned on, but does not operate the pistons, which means that the pump is not pumping fluid. During the self-adjustment procedure, the measuring device carries out a recording step to record the "background noise" of the pumping plant for a given time interval. This interval is indicated, in the diagram of FIG. 7, as "noise-search" step. At the end of the "noise-search" step of the self-adjustment, the procedure determines two thresholds, a positive one and a negative one corresponding to the positive maximum value and to the negative maximum value of the vibrations measured during the noise search step. The positive threshold is indicated as "Gmax positive", whereas the negative threshold is indicated as "Gmax negative". Self-adjustment button 16 present on transmitting module 4, 4*a* can be used to start the self-adjustment procedure in order to detect the background noise, which will be contained in the range "Gmax positive"-"Gmax negative".

According to the pump stroke calculation procedure, in the steps following the calibration, i.e. in the pumping steps, the acceleration values measured by transmitting module 4, 4*a* having an amplitude ranging between the two thresholds "Gmax positive" and "Gmax negative" are not taken into account, as they correspond to the background noise generated, for example, by the vibrations of the motor without any load applied thereto, by auxiliary hydraulic or mechanical organs of motor pump 1 (e.g. components of the cooling system, fans of radiators, water pump, etc.), or by other auxiliary maneuvers carried out by motor pump 1, for example movements on the ground in case motor pump 1 is self-moving. Through the adjustment of trimmer 15, or through button 20, users will have the chance to set an offset value, also known as "stroke-offset", which, added to "Gmax positive" and subtracted from "Gmax negative", respectively, determines two acceleration amplitude values, a positive one and a negative one, namely said stroke detection thresholds, whose exceeding will indicate the execution of a "pump stroke" by the pumping system. In the diagram of FIG. 7 there are the two stroke detection thresholds, determined by the sum of "Gmax" and of the "stroke-offset". The values of "Gmax positive" and "Gmax negative" detected during the self-adjustment can be different from one another and, hence, the value of the "positive stroke detection threshold" resulting from "Gmax positive"+stroke-offset can be, in general, different from the value of the "negative stroke detection threshold" resulting from "Gmax negative"–stroke-offset. Once the pumping step has started and the pump stroke measuring device has started working as well, the microcontroller present in transmitting module 4, 4*a* increases the counting of the pump strokes every time the amplitude of the positive or negative acceleration exceeds the value of one of the two "stroke detection thresholds", namely when one of the two thresholds is crossed by the development of the measured signal. Hence, in this case, the threshold interval ranges between the two stroke detection thresholds, i.e. "stroke detection threshold (+)" and "stroke detection threshold (–)". The calibration is carried out only when the measuring device is started for the first time and is repeated when the device is installed on a new pumping plant.

During the pumping step it can happen that, following a peak of the acceleration value caused by a pump stroke, there is a second peak immediately after, due to secondary phenomena comparable to pressure "bounces" or "kicks". This second acceleration peak due to the kick can have an amplitude exceeding the "stroke detection value". Therefore, there can be vibrations whose intensity exceeds the threshold interval, but these vibrations do not actually correspond to a pumping step of motor pump 1; for example, these anomalous vibrations do not correspond to the stroke of the piston of motor pump 1. In order to prevent this second peak from being wrongly counted as pump stroke, the device allows for the adjustment of a suitable filter, which is applied during the reading of the vibration signal. This filter, which is a time filter and is indicated as "time filter" in FIG. 7, is activated every time the acceleration value exceeds a "stroke detection threshold", namely every time the acceleration diagram goes out of the area defined between the two "stroke detection thresholds" and remains active for an adjustable time interval indicated as "time filter". By means of trimmer 14, or button 19, present on transmitting module 4, 4*a*, it is possible to set the duration of the "time filter" in the diagram, which will help distinguish pump strokes from said secondary acceleration peaks.

Therefore, the pump stroke, indicated in the diagram as "peak detection", will be counted only the first time that the amplitude of the acceleration exceeds the positive or negative detection threshold value. In this instant the counting of the time of intervention of the time filter starts and, hence, a possible second pump stroke will be counted only at the end of the amount of time set as "time filter". With every detected pump stroke, the microcontroller of transmitting module 4, 4*a* sends an impulse to radio transmitter 12, which transmits the signal to receiving module 5. Receiving module 5, through micro controller 26, turns the received signal into a given voltage value corresponding to a counted pump stroke and provides it as output item of information. According to a possible variant, the output signal of transmitting module 4, 4*a* can be sent to the control system of drilling machine 3; or, according to a further variant, the signal can be sent to a graphic displaying device, such as a display.

In other words, the "pump stroke" can be defined as a pumping condition of motor pump 1 such as to cause a vibration corresponding to an acceleration having an intensity exceeding a predetermined threshold, in particular the detection threshold value, and corresponding to the stroke of one or more pistons (e.g. the pumping pistons) of motor pump 1. Therefore, knowing the features of the motor of motor pump 1 (e.g. displacement, number of pistons, etc.), it is possible to know the flow rate of the fluid as a function of the vibrations detected by accelerometer 9. Hence, the pump stroke corresponds to the stroke of the pistons of the motor pump 1 during the pumping step. By mere way of example, the frequency of the pump strokes can be meant as the value of the revolutions/minute of an internal combustion engine. According to possible variants, motor pump 1 can have an electric motor. In any case, in the empty operating condition, motor pump 1 is working and, even if the fluid is not actually pumped, it 1 generates vibrations due to its operation, for instance the vibrations can be caused by mechanical or hydraulic elements.

The method to use the flow rate measuring device described above is designed in such a way that, after having performed the quick connection of transmitting module 4, 4a to the pumping plant, for example on board motor pump 1 or fixed to connection pipe 2, transmitting module 4, 4a sends the information to receiving module 5 through wireless transmission. Receiving module 5 generates an output signal indicating the detected pump strokes, said signal can be, for instance, in the form of a binary value of electric voltage and can be sent to logic controller 32, which is part of the control system of drilling machine 3; or the signal can be sent to a displaying device independent of the control system of drilling machine 3. In particular, receiving module 5 generates a square wave signal, wherein the voltage assumes a predetermined positive value upon detection of a pump stroke and assumes a zero voltage value in the interval between a stroke and the following one.

The control system of drilling machine 3, after having received—as an input—said voltage value, uses it to indicate, on a display visible to the operator (e.g. in the control cabin), the frequency and the total number of the pump strokes and carries out, always through said value, the calculation of the instantaneous flow rate of the pump (e.g. in liters per minute), multiplying the frequency of the strokes per minute by the specific flow rate of motor pump 1. Starting from the instantaneous flow rate value or from the counted number of strokes, the control system of drilling machine 3 can then calculate the value of the volume of fluid pumped since the moment in which the measurement started. According to a possible embodiment of the invention, these calculations can be directly performed by one of modules 4, 5. In particular, the control system of drilling machine 3 is configured to receive, from receiving module 5, signals indicating the fluid flow rate and, based on said signals, to carry out the following operations: showing the user the value of the instantaneous flow rate of the fluid, showing the user the volume of pumped fluid, and recording these items of information. These items of information are handy for the user. Furthermore, the recorded items of information are useful to create a time record of the performed operations, which, for instance, is useful to keep track of the progression of the works in the drilling site. The control unit is optionally adapted to record further items of information, depending on the needs.

According to a possible embodiment, the control system of drilling machine 3 is configured to set an automatic resurfacing speed of drilling tool 21, which is based on the values produced by receiving module 5 and indicating the fluid flow rate. Therefore, the control system of drilling machine 3 is configured to use the signal indicating the measured flow rate value in order to control drilling tool 21 (in particular, the rotation and translation actuators), so that, during the pumping, drilling tool 21 is caused to resurface with a speed that is automatically controlled by the control system of drilling machine 3. By so doing, the resurfacing speed of drilling tool 21 is proportional to the flow rate of the fluid pumped into the hole.

In a possible variant, the output data of the transmitting module 4, 4a is sent to a displaying device, such as a display, which will show the measured data. The displaying device is placed on drilling machine 3 in a position visible by the operator, for example in the cabin. The displaying device is not connected to the control system of drilling machine 3 and, therefore, does not interact with drilling machine 3. The data displayed by the displaying device gives the operator indications on drilling machine 3 and the operator, based on this data, can adjust the operating parameters of drilling machine 3 accordingly by acting upon the controls of drilling machine 3, for example adjusting the resurfacing speed of drilling tool 21 by acting upon the controls available in the cabin.

When motor pump 1 or the portion of connection pipe 2 needs to be replaced, for example to carry out scheduled maintenances, these operations are made much easier thanks to the flow rate measuring device according to the invention. Indeed, the transmitting module 4, 4a can easily be removed from motor pump 1, for example by simply separating the magnetic base from the body of motor pump 1. Similarly, transmitting module 4, 4a can easily be removed from connection pipe 2, for example by simply loosening ties 23 or the clamps. Once drilling machine 3 has been connected to the new pumping plant, transmitting module 4, 4a can easily and quickly be connected to the new motor pump 1 or to the new connection pipe 2. This feature significantly reduces the intervention times and the number of people needed for the connection of the measuring device to the pumping plant.

Figure 8:
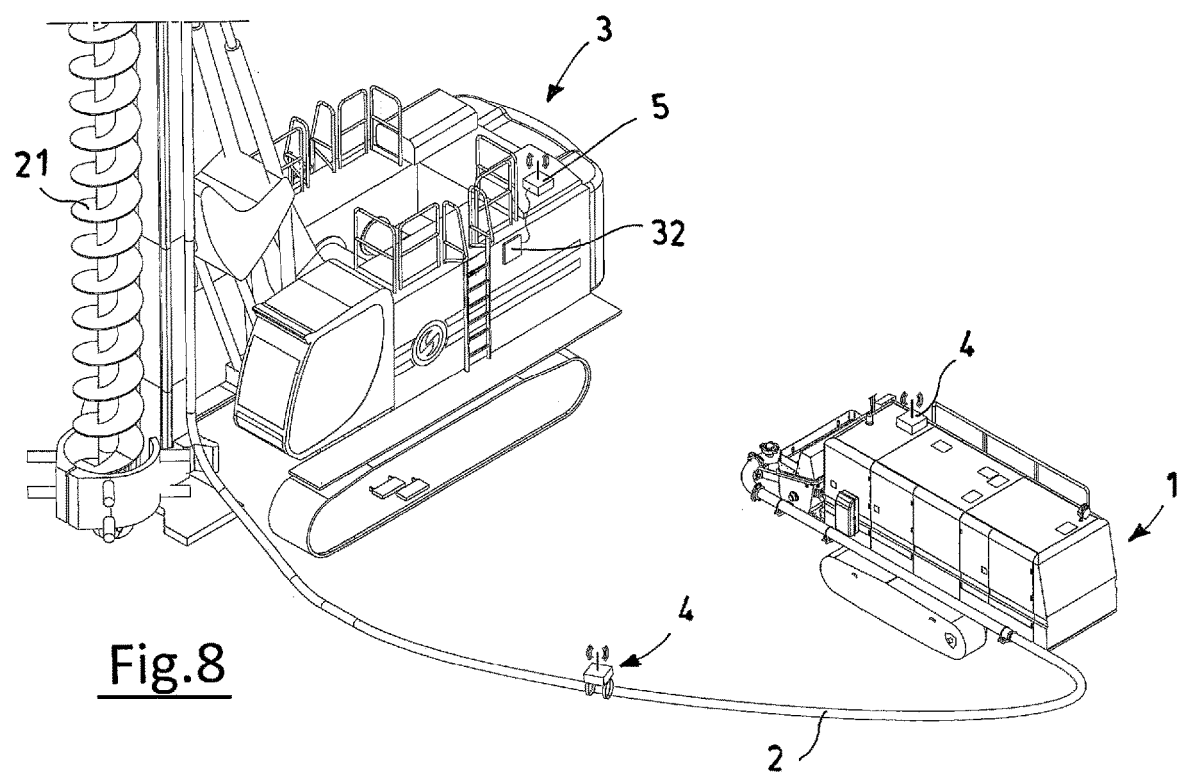
FIG. 8 is a perspective view of a variant of the flow rate measuring device installed on a system with a plurality of transmitting modules 4 installed in different points of the pumping system.

In a possible variant of the invention, which is shown in FIG. 8, there is a plurality of transmitting modules 4 installed in different points of the pumping system consisting of motor pump 1 and of connection pipes 2. Therefore, the acceleration values are detected in different points of the pumping system, so as to more precisely count the pump strokes; the measured items of information are then sent to receiving module 5. In this case, one of said transmitting modules 4 (for instance, the one mounted on motor pump 1) acts like a "gateway", whereas the other transmitting modules 4 (for instance, mounted on connection pipe 2) act like "nodes". Gateway transmitting module 4, besides processing the acceleration signals due to the vibrations detected on motor pump 1 by means of one or more accelerometers 9, as mentioned above, is adapted to receive and process the signals coming from the other node transmitting modules 4, which indicate the detected accelerations. Gateway transmitting module 4 is adapted to process the plurality of signals received from node transition modules 4 and, based on these signals, is adapted to send signals to receiving module 5, which, in turn, is adapted to generate an output signal indicating the number of detected pump strokes and, hence, the measured flow rate.

Therefore, the invention is capable of solving the main problems affecting the prior art solutions of the technical field. In particular, it is completely independent of the apparatuses involved in the drilling and in the pumping, thus being capable of being connected and disconnected in a few minutes. In particular, the transmitting module, which is provided with the acceleration sensor that allows the pump strokes to be detected, is not electrically connected to the electrical system of the motor pump, is not hydraulically connected to the hydraulic system of the motor pump, does not have mechanical connections to moving mechanical parts of the motor pump, and does not have sensors facing the inside of the connection pipe. This leads to a significant advantage in the aforesaid machine change operations, because no more interventions, either of the mechanical type or inside the distribution boards, are needed in order to remove and restore the connections between the motor pump and the drilling apparatus. Said at least one transmitting module simply needs to be removed from the motor pump or disconnected from the connection pipe. Furthermore, the measuring device does not suffer from the mechanical wear problems affecting prior art systems, wherein there is a pressure sensor in contact with the pumped fluid, for example a pressure sensor facing the inside of the fluid pumping pipe.

The invention also discloses the use of a device according to the possible variants of the inventions to measure the flow rate of a fluid, such as concrete, in a pumping plant connected to a drilling machine 3 provided with a drilling tool 21, said pumping plant comprising a motor pump 1 and a connection pipe 2 to lead the fluid from said motor pump 1 to drilling tool 21.

Naturally, the principle of the invention being set forth, embodiments and implementation details can be widely changed relative to what described above and shown in the drawings as a mere way of non-limiting example, without in this way going beyond the scope of protection provided by the accompanying claims.

Barzanò & Zanardo Milano S.p.A.
/LT/GV

KEY TO REFERENCE NUMBERS motor pump 1
connection pipe 2
drilling machine 3
transmitting module 4
receiving module 5
base box 6
lid 7
electronic board 8
accelerometer 9
microcontroller 10
battery 11
radio transmitter 12
LED 13
trimmer 14
trimmer 15
adjustment button 16
on/off button 17
display 18
button 19
drilling tool 21
button 20
ties 23
electronic board 25
microcontroller 26
receiving radio module 27
electrical connection 28
electrical connection 29
base box 30
lid 31
logic controller 32

The invention claimed is:

1. A device to measure flow rate of a hardening fluid, such as concrete, in a pumping plant connected to a drilling machine provided with a drilling tool, said pumping plant comprising a piston motor pump and a connection pipe to lead the hardening fluid from said piston motor pump to the drilling tool; said device comprising:
at least one transmitting module, adapted to be rigidly mounted and in a removable manner, on the piston motor pump or the connection pipe of the pumping plant and comprising at least one accelerometer;
a receiving module, adapted to be associated with the drilling machine;
wherein the transmitting module is configured to detect accelerations generated by vibrations of the pumping plant during pumping of the hardening fluid, said accelerations indicating a flow rate of the hardening fluid, and to send a signal, which is processed based on the detected accelerations, to the receiving module through wireless transmission;
wherein the receiving module is configured to receive the signal from the transmitting module and to send a signal indicating the flow rate of the pumped hardening fluid based on the received signal;
wherein the transmitting module is configured so that, if the intensity of the accelerations detected by the accelerometer remains within detection threshold values, said accelerations are not taken into account to emit the signal generated by the transmitting module; and
wherein the transmitting module is configured to analyze intensity of the vibrations for a predetermined adjustment time, during which a motor of the motor pump is in an operating condition in which said motor pump does not pump the fluid, and to determine an adjustment interval which is defined by the maximum positive and negative values of the acceleration detected in the adjustment time; the detection threshold values are determined based on the adjustment time.

2. The device according to claim 1, wherein the transmitting module comprises a connector to rigidly mount and in a removable manner, said transmitting module on the motor pump of the pumping plant.

3. The device according to claim 1, wherein the transmitting module comprises a connector to rigidly mount and in a removable manner, said transmitting module on the connection pipe of the pumping plant.

4. The device according to claim 1, wherein the receiving module is configured to send the signal indicating the flow rate to a control system of the drilling machine.

5. The device according to claim 1, wherein the receiving module is configured to send the signal indicating the flow rate to a displaying device to display at least one among the following data: frequency of pump strokes of the piston motor pump, total number of pump strokes, flow rate of the hardening fluid, total volume of pumped hardening fluid.

6. The device according to claim 1, comprising at least one display to display operating information.

7. The device according to claim 1, wherein a control system of the drilling machine is configured to set an automatic resurfacing speed of the drilling tool, which is based on the values produced by the receiving module and indicating the flow rate of the hardening fluid pumped by the piston motor pump.

8. The device according to claim 1, wherein the transmitting module comprises at least one control element, to set the detection threshold values for the detected accelerations.

9. The device according to claim 1, wherein, when the detected acceleration exceeds one of the detection threshold values, the transmitting module is configured to generate a signal corresponding to the exceeding of the threshold value.

10. The device according to claim 9, wherein a control system of the drilling machine is configured to receive, from the receiving module, signals indicating the flow rate of the pumped hardening fluid and, based on said signals, to carry out the following operations: showing the user the value of the instantaneous flow rate of the pumped hardening fluid, showing the user the volume of pumped hardening fluid, and recording these data.

11. A device to measure flow rate of a hardening fluid, such as concrete, in a pumping plant connected to a drilling machine provided with a drilling tool, said pumping plant comprising a piston motor pump and a connection pipe to lead the hardening fluid from said piston motor pump to the drilling tool; said device comprising:

at least one transmitting module, adapted to be rigidly mounted and in a removable manner, on the piston motor pump or the connection pipe of the pumping plant and comprising at least one accelerometer;

a receiving module, adapted to be associated with the drilling machine;

wherein the transmitting module is configured to detect accelerations generated by vibrations of the pumping plant during pumping of the hardening fluid, said accelerations indicating a flow rate of the hardening fluid, and to send a signal, which is processed based on the detected accelerations, to the receiving module through wireless transmission;

wherein the receiving module is configured to receive the signal from the transmitting module and to send a signal indicating the flow rate of the pumped hardening fluid based on the received signal;

wherein the transmitting module is configured so that, if the intensity of the accelerations detected by the accelerometer remains within detection threshold values, said accelerations are not taken into account to emit the signal generated by the transmitting module;

wherein, when the detected accelerations exceed one of the detection threshold values, the transmitting module is configured to generate a signal corresponding to the exceeding of the threshold value;

wherein the transmitting module is configured so that, when the amplitude of the detected accelerations exceeds one of the detection threshold values, the accelerations following the exceeding are not taken into account to emit the signal output by the transmitting module, if said accelerations take place in a time interval defined by a time filter.

12. The device according to claim 11, wherein the transmitting module comprises at least one control element, to set the time filter.

13. A method of using the device according to claim 1, comprising measuring the flow rate of a fluid, such as concrete, in pumping plant connected to a drilling machine provided with a drilling tool.

* * * * *